(12) United States Patent
Lu

(10) Patent No.: US 7,552,260 B2
(45) Date of Patent: Jun. 23, 2009

(54) METHOD FOR DYNAMICALLY ARRANGING INTERRUPT PINS

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 240 days.

(21) Appl. No.: 11/749,166

(22) Filed: May 16, 2007

(65) Prior Publication Data

US 2008/0288694 A1 Nov. 20, 2008

(51) Int. Cl.
G06F 13/00 (2006.01)
G06F 9/46 (2006.01)

(52) U.S. Cl. .................... 710/260; 710/266
(58) Field of Classification Search .......... 710/260–269
See application file for complete search history.

(56) References Cited

U.S. PATENT DOCUMENTS

| | | | | |
|---|---|---|---|---|
| 6,141,703 A | * | 10/2000 | Ding et al. | 710/10 |
| 6,636,916 B1 | * | 10/2003 | Campbell et al. | 710/266 |
| 6,704,823 B1 | * | 3/2004 | Perez et al. | 710/260 |
| 6,742,060 B2 | * | 5/2004 | Poisner et al. | 710/48 |
| 6,789,142 B2 | * | 9/2004 | Diamant | 710/48 |
| 6,877,057 B2 | * | 4/2005 | Alexander et al. | 710/263 |
| 7,028,302 B2 | * | 4/2006 | Kiick | 718/105 |
| 2002/0029310 A1 | * | 3/2002 | Klein | 710/260 |

* cited by examiner

*Primary Examiner*—Glenn A Auve
*Assistant Examiner*—Trisha Vu
(74) *Attorney, Agent, or Firm*—Jianq Chyun IP Office

(57) ABSTRACT

A method for dynamically arranging interrupt pins is provided, which is suitable for arranging a plurality of interrupt pins of a control chip. In this method, a number of interrupts sent from each of a plurality of device paths in a unit time is detected. The device paths are sorted according to the interrupt numbers thereof. Then, from the one in the head of the sequence, the devices paths are arranged to the interrupt pins. Herein, when arranging a device path, an interrupt checking number required to check the device path sending the interrupt every time an interrupt is produced in each of the interrupt pins is calculated. Then, when arranging the next device path, the device path is arranged to the interrupt pin with the least interrupt checking number.

12 Claims, 5 Drawing Sheets

| Interrupt pin | Arranged device path | Interrupt checking number |
|---|---|---|
| 1 | DP3 | 500 |
| 2 | DP2,DP6 | 210 |
| 3 | DP1,DP4,DP0 | 230 |
| 4 | DP5,DP7,DP8 | 280 |

| PCI slot | Interrupt message corresponding to interrupt pins | Interrupt routing register (Rx_A, Rx_B, Rx_C, Rx_D) |
|---|---|---|
| slot #1 | INT A, B, C, D | 1, 2, 3, 4 |
| slot #2 | INT D, A, B, C | 4, 1, 2, 3 |
| slot #3 | INT C, D, A, B | 3, 4, 1, 2 |
| slot #4 | INT B, C, D, A | 2, 3, 4, 1 |

FIG. 2 (PRIOR ART)

| Device path | Interrupt number |
|---|---|
| DP0 | 10 |
| DP1 | 100 |
| DP2 | 130 |
| DP3 | 500 |
| DP4 | 50 |
| DP5 | 70 |
| DP6 | 40 |
| DP7 | 60 |
| DP8 | 30 |

FIG. 4

| Device path | Interrupt number |
|---|---|
| DP3 | 500 |
| DP2 | 130 |
| DP1 | 100 |
| DP5 | 70 |
| DP7 | 60 |
| DP4 | 50 |
| DP6 | 40 |
| DP8 | 30 |
| DP0 | 10 |

FIG. 5

| Interrupt pin | Arranged device path | Interrupt checking number |
|---|---|---|
| 1 | DP3 | 500 |
| 2 | DP2,DP6 | 210 |
| 3 | DP1,DP4,DP0 | 230 |
| 4 | DP5,DP7,DP8 | 280 |

FIG. 6

METHOD FOR DYNAMICALLY ARRANGING INTERRUPT PINS

BACKGROUND OF THE INVENTION

1. Field of the Invention

The present invention relates to a routing method, and more particularly, to a method for dynamically arranging interrupt pins.

2. Description of Related Art

Interrupt Request (IRQ) is used for informing and requiring a processor to suspend the operation when a certain device intends to perform a specific action, so as to execute a corresponding calculation. The IRQ is sent through so-called interrupt lines, and the number of the interrupt lines varies depending on interrupt controllers adopted by the motherboard. A programmable interrupt controller (PIC) conventionally used in a computer includes 16 interrupt lines. However, these interrupt lines are still insufficient for the computer equipment with gradually powerful functions and gradually advanced input/output device, and most of the interrupt lines are occupied, or even shared by a plurality of hardware devices. Accordingly, some new motherboards adopt an advanced programmable interrupt controller (APIC), which can manage, generally, 24 IRQs (e.g., IOAPIC built in Intel ICHx and ESB2 series, herein some of them are used by message signal interrupts). Therefore, it can be used by many hardware devices, and can avoid sharing the interrupt lines.

If a PIC motherboard is used, only 4 interrupt lines can be used by PCI bus in practice. On the other aspect, if an APIC motherboard is used, 8 interrupt lines can be used. It indicates that even though the motherboard has 6 PCI shots, they can use only 4 or 8 IRQs. Moreover, accelerated graphics port (AGP), universal serial bus (USB), redundant array of independent disks (RAID) controller, and some onboard local area network (LAN) interfaces, 1394 interfaces and serial ATA (SATA) interfaces all should use IRQs. Under this circumstance, a plurality of PCI slots sharing one IRQ is unavoidable.

FIG. 1 is a hardware configuration diagram of a conventional PIC/IOAPIC motherboard. Referring to FIG. 1, the conventional PIC motherboard is disposed with a central processing unit (CPU) 110, Northbridge chip 120, Southbridge chip 130 and 4 PCI slots 140, 150, 160 and 170. The PCI slots 140, 150, 160 and 170 are used to transmit 4 interrupt messages INTA/INTB/INTC/INTD respectively to interrupt routing registers Rx_A, Rx_B, Rx_C and Rx_D (x=1,2,3,4) on the Northbridge chip 120. Since the PIC motherboard only supports 4 IRQs, when the Northbridge chip 120 transmits interrupt messages to the Southbridge chip 130, the PCI slots 140, 150, 160 and 170 share the 4 interrupt lines to sent the interrupt messages. The Southbridge chip 130 receives the interrupt messages transmitted by the Northbridge chip 120 via 4 interrupt router registers RA, RB, RC and RD respectively. The interrupt messages are then sent to a programmable interrupt controller (8259 PIC), and then, the 8259 PIC sends an IRQ to the CPU 110. It should be noted that, the conventional IOAPIC motherboard has an additional IOAPIC compared with the PIC motherboard, and sends the IRQ to the CPU 110 via the 8259 PIC and the IOAPIC.

FIG. 2 shows a configuration table of the routing for conventional interrupt pins. Referring to FIG. 2, the pins A, B, C, D of each PCI slot respectively correspond to different interrupt messages INTA/INTB/INTC/INTD, and the Basic Input/Output System (BIOS) also arranges the IRQs for being used or shared corresponding to different interrupt messages INTA/INTB/INTC/INTD when executing the Power-On Self Test (POST). For example, the pins A, B, C, D of slot #2 correspond to the interrupt messages INTA/INTB/INTC/INTD, and thus when arranging the IRQs, numbers of 4, 1, 2, 3 are stored in the corresponding interrupt router registers R2_A, R2_B, R2_C and R2_D according to the sequence, so as to trigger the IRQ through the interrupt pins 4, 1, 2, 3 of the IOAPIC.

If the 4 PCI slots all have one PCI interface card inserted therein, and each PCI interface card requires to trigger 4 interrupts respectively through the interrupt pins 1, 2, 3, 4, there are 4 hardware devices shared on each IOAPIC interrupt line, and 4 hardware drivers are required to be connected in series to the 4 interrupt lines. Accordingly, in such a circumstance, the sharing status of each IOAPIC interrupt line is the same, which is the optimized situation.

The above method is suitable for arranging PCI slots on the basis that the frequencies of the interrupts sent by the PCI devices disposed on each PCI slot are almost the same. However, in practical application, the numbers of interrupts sent by different PCI devices in a unit time are different, that is, some PCI devices are very busy, whereas some PCI devices are rather idle. This characteristic still causes the arrangement of interrupt pins to be non-uniform, and thus, the conventional technique is not the optimum arranging manner.

SUMMARY OF THE INVENTION

Accordingly, the present invention is directed to a method for dynamically arranging interrupt pins, which arranges device paths according to a frequency of interrupts sent from each of the interrupt pins, so as to reduce a checking number required to determine the driver that sends the interrupt every time an interrupt is produced.

As embodied and broadly described herein, the present invention provides a method for dynamically arranging interrupt pins, which is suitable for arranging a plurality of interrupt pins of a control chip. The method includes: first, directing a number of interrupts sent from each of a plurality of device paths in a unit time; next, sorting the device paths into a sequence according to the interrupt number of each of the device paths; and then, from the one in the head of the sequence, arranging the device paths to the interrupt pins sequentially, such that an interrupt checking number required to check the device path sending an interrupt every time the interrupt is produced in each of the interrupt pins is the least.

In an embodiment of the present invention, the step of arranging the device paths to the interrupt pins includes: calculating an interrupt checking number required to check the device path sending the interrupt every time an interrupt is produced in each of the interrupt pins, according to the interrupt numbers of each of the device paths; when arranging the next device path, adding the device path to each of the interrupt pins, and respectively calculating an interrupt checking number required to check the device path sending the interrupt every time an interrupt is produced in each of the interrupt pins, after this device path is added; and finally, arranging this device path to the interrupt pin with the least interrupt checking number.

In an embodiment of the present invention, the process of checking the interrupt checking number required to check the device path sending the interrupt is performed through drivers of a hardware device correspondingly allocated on each of the device paths.

In an embodiment of the present invention, the step of calculating the interrupt checking number required to check the device path sending the interrupt every time an interrupt is produced in each of the interrupt pins includes establishing a sequence directing to the device paths arranged to the interrupt pins. The device path last added to the interrupt pin is sorted at the end, next, the interrupt number of each of the device paths is multiplied by a weight according to this sequence, and then, the calculation results are added, so as to obtain the interrupt checking number.

In an embodiment of the present invention, after the step of arranging the device paths to the interrupt pins, the method further includes connecting drivers of the hardware devices allocated on each of the device paths in series according to the above sequence. The hardware devices include interface card.

In an embodiment of the present invention, the process for detecting the number of interrupts sent from each of a plurality of device paths in a unit time is performed through drivers of the hardware devices correspondingly allocated on each of the device paths. The device paths and the corresponding interrupt numbers are then recorded in a memory, in which the memory includes a non-volatile random access memory (NVRAM).

In an embodiment of the present invention, the interrupt pins are connected to one of a programmable interrupt controller (PIC) and an I/O advanced programmable interrupt controller (IOAPIC), and the control chip includes one of a Northbridge chip and a Southbridge chip.

In an embodiment of the present invention, the process for sorting the device paths according to the interrupt numbers of each of the device paths includes sorting in a sequence from large to small.

In the present invention, the frequency of interrupts sent from each of the interrupt pins is calculated on the basis of the numbers of interrupts produced on each of the hardware devices, so as to dynamically arrange device paths to each of the interrupt pins. According to the arranging sequence of the device paths, the drivers of the hardware devices allocated on the device paths are connected in series, such that the checking number required to determine the driver that sends the interrupt every time an interrupt is produced is reduced.

In order to make the aforementioned and other objects, features, and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 shows a configuration table of the routing for conventional interrupt pins.

FIG. 4 shows an interrupt record table according to an embodiment of the present invention.

FIG. 5 shows an interrupt record table after the sorting process according to an embodiment of the present invention.

FIG. 6 shows an arrangement result of interrupt pins according to an embodiment of the present invention.

DESCRIPTION OF EMBODIMENTS

In order to optimize the arrangement of the interrupt pins, in the present invention, values of registers on the control chip are dynamically adjusted according to the current number of interrupts sent from each of the device paths during the process of executing a power-on self test by the BIOS, such that the numbers of interrupts that might be produced on each of the interrupt pins are relatively uniform, so as to reduce the checking number required to check the driver that sends the interrupt every time an interrupt is produced. In order to make the content of the present invention be more comprehensible, embodiments are described below as examples that the present invention is implemented accordingly.

Figure 1:
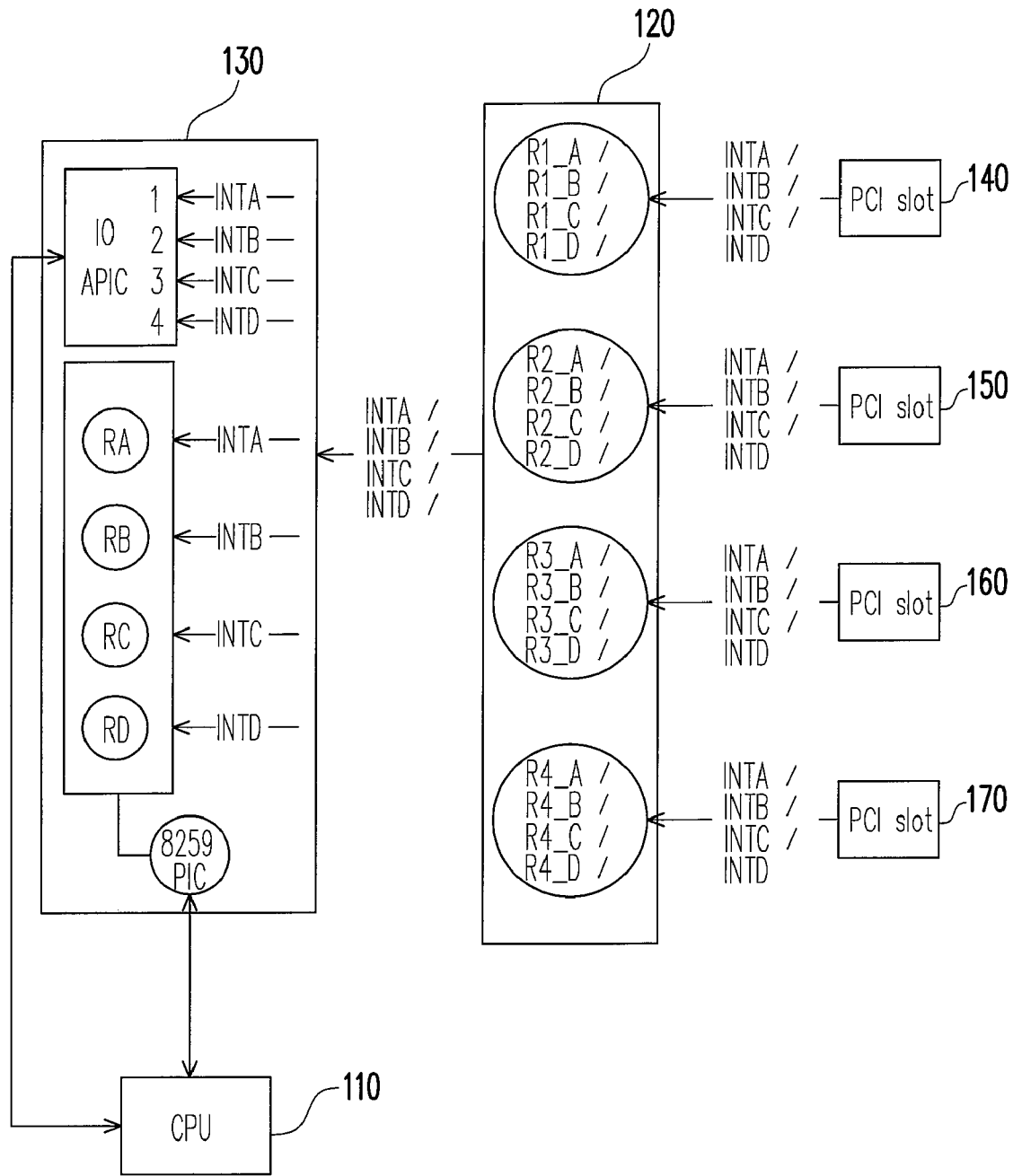
FIG. 1 is a hardware configuration diagram of a conventional PIC/IOAPIC motherboard.
Figure 3:
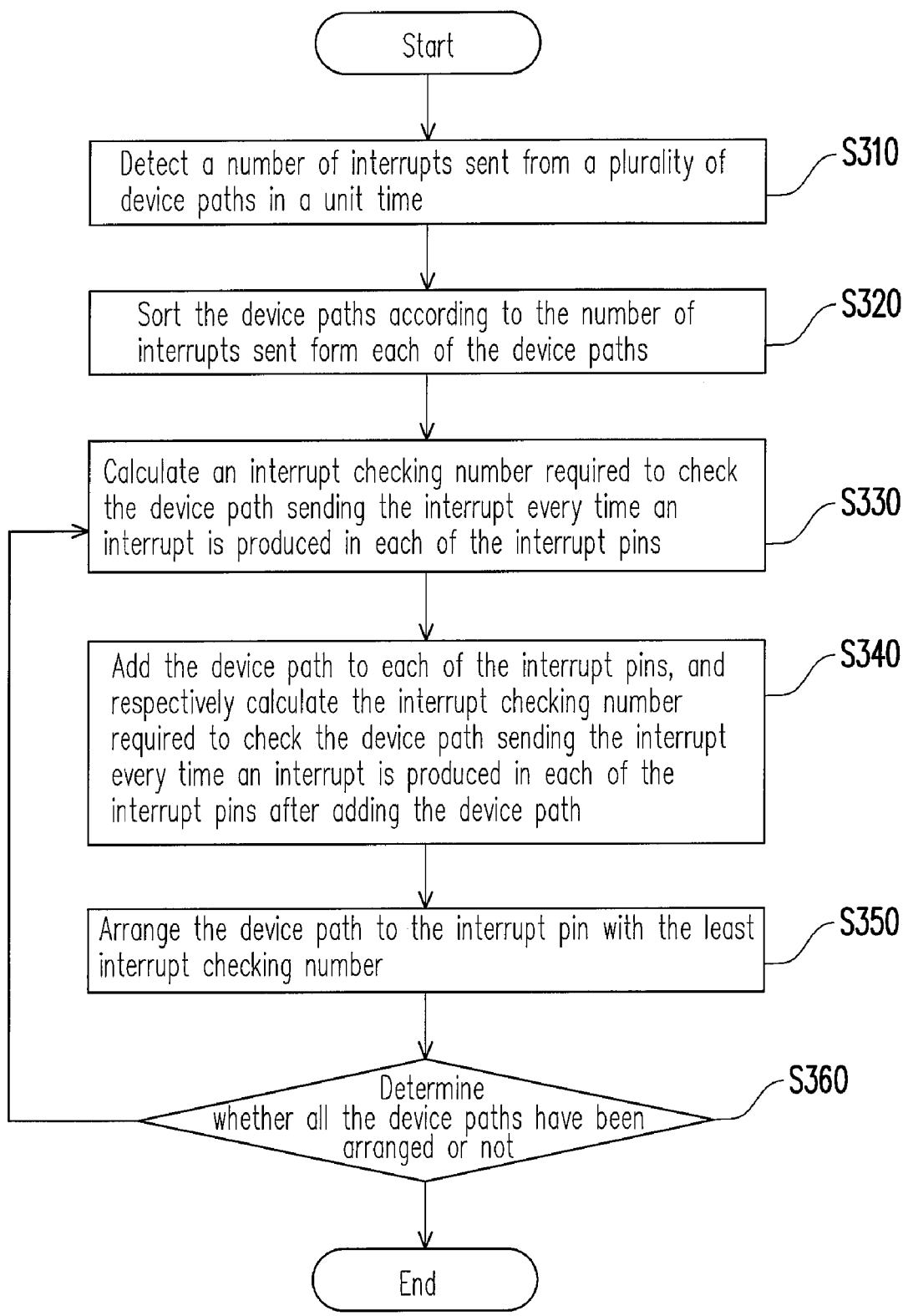
FIG. 3 is a flow chart of a method for dynamically arranging interrupt pins according to an embodiment of the present invention.

FIG. 3 is a flow chart of a method for dynamically arranging interrupt pins according to an embodiment of the present invention. Referring to FIG. 3, this embodiment is suitable for arranging a plurality of interrupt pins of a control chip. The control chip is, for example, a Northbridge chip or a Southbridge chip, and the interrupt pins are connected to, for example, a programmable interrupt controller (PIC) or an I/O advanced programmable interrupt controller (IOAPIC).

First, in a unit time, a number of interrupts sent from a plurality of device paths is detected (Step S310). The interrupt number is obtained through a driver of a hardware device allocated on each of the device paths. The driver counts the number of interrupts sent by itself in a unit time, and feeds back the data such as a corresponding PCI device/function address (PFA), a device path (the generalized device path includes the PFA) and the interrupt number to an operating system. After collecting the data fed back by all drivers, the operating system gathers the data into an interrupt record table and stores the table in a memory of the system. Herein, the above hardware device is, for example, an interface card, and the memory is, for example, a non-volatile random access memory (NVRAM), which are not limited in the present invention. FIG. 4 shows an interrupt record table according to an embodiment of the present invention. Referring to FIG. 4, the first column records device paths (DP), and the second column records the number of interrupts produced correspondingly on each of the device paths.

Then, the device paths are sorted according to the number of interrupts sent form each of the device paths (Step S320). Herein, the sorting process is, for example, sorting in a sequence from large to small, which is convenient for arranging the subsequent interrupt pins. FIG. 5 is an interrupt record table after the sorting process according to an embodiment of the present invention. As shown in FIG. 5, among all the device paths, the largest interrupt number is 500 of DP3, and the smallest interrupt number is 10 of DP0.

Finally, from the one at the head of the sequence, the device paths are arranged to the interrupt pins, such that the interrupt checking number required to check the device path sending the interrupt every time an interrupt is produced in each of the interrupt pins is the least. This step includes: calculating the interrupt checking number required to check the device path that sends the interrupt every time an interrupt is produced in each of the interrupt pins, according to the previously-recorded interrupt numbers of the device paths (Step S330); next, when arranging the next device path, adding the device path to each of the interrupt pins based on the currently calculated interrupt checking number of each of the interrupt pins; then, respectively calculating the interrupt checking number required to check the device path sending the interrupt every time an interrupt is produced in each of the interrupt pins, after the device path is added (Step S340); and finally, arranging the device path to the interrupt pin with the least interrupt checking number (Step S350). Next, it is determined whether all the device paths have been arranged or not (Step S360). If not, the process returns to Step S330, for continuing calculating the interrupt checking number required to check interrupts in each of the current interrupt pins, and then, arranging the next device path; otherwise, if all the device paths have already been arranged, the steps of dynamically arranging interrupt pins according to the present invention are finished.

It should be noted that, when calculating the above interrupt checking numbers, this embodiment further includes establishing a sequence directing to the device paths arranged to the interrupt pins. The sequence can be fed back to the system through an advanced configuration and power interface (ACPI) source language (ASL) ordered by the ACPI, so as to connect the drivers of the hardware devices allocated on the device path in series, and thereby reducing the interrupt checking number required to check the driver that sends the interrupt.

Herein, the process of establishing the sequence is sorting the newest or latest added device path at the end, multiplying the interrupt number of each of the device paths by a weight when calculating the interrupt checking number, and adding the resulted products of the device paths, and thereby finally obtaining the interrupt checking number.

For example, it is assumed that the current system has 4 interrupt pins, which are arranged to the interrupt pins according to the interrupt record table shown in FIG. 5. At first, no device path is arranged to the 4 interrupt pins, and thus, the first 4 device paths are naturally arranged to the 4 interrupt pins respectively. At this time, only one device path is arranged to each of the interrupt pins. Therefore, when calculating the interrupt checking number of each of the interrupt pins, the interrupt number of each of the device paths is taken as the interrupt checking number, and at this time, the interrupt checking number of each of the interrupt pins is listed as follows:

Checkcount[1]=500
Checkcount[2]=130
Checkcount[3]=100
Checkcount[4]=70.

Among the above interrupt pins, the $4^{th}$ interrupt pin has the least interrupt checking number. Accordingly, the next step is firstly arranging the device path DP7 to the 4 interrupt pin, and re-calculating the interrupt checking number of the $4^{th}$ interrupt pin. The calculating step includes: sorting the driver corresponding to the latest added device path DP7 ahead of the device path DP5, and then, calculating the interrupt checking number of the $4^{th}$ interrupt pin. After the device path DP5 has already been arranged, the total interrupt checking numbers of all the interrupt pins are listed as follows:

Checkcount[1]=500
Checkcount[2]=130
Checkcount[3]=100
Checkcount[4]=70+60*2=190.

Herein, the device path DP7 is sorted at the back, and if the interrupt is sent by the device path DP7, when checking the one that sends the interrupt, the device path DP5 arranged at the head is checked first. If it is found that the interrupt is not sent by the device path DP5 after checking, it is then checked whether the device path DP7 is the one that sent the interrupt or not. Therefore, when calculating the interrupt checking number in practice, the interrupt checking number 70 required to check the device path DP7 must be added with the interrupt checking number (60+60) required to check the device path DP5, thereby obtained a result of a total interrupt checking number of 190.

Based upon the above principle, when arranging the next device path DP4, it can be selectively arranged to the $3^{rd}$ interrupt pin with the least interrupt checking number (100) currently, and the interrupt checking number of the $3^{rd}$ interrupt pin is calculated. After arranging the device path DP4, the total interrupt checking numbers of all interrupt pins are listed as follows:

Checkcount[1]=500
Checkcount[2]=130
Checkcount[3]=100+50*2=200
Checkcount[4]=70+60*2=190.

Similarly, the rest device paths are sequentially arranged to the interrupt pins with the least interrupt checking numbers, in which two or more device paths can be connected in series to one interrupt pin, but which is not limited herein. Finally, the total interrupt checking numbers of all interrupt pins are listed as follows:

Checkcount[1]=500
Checkcount[2]=130+40*2=210
Checkcount[3]=100+50*2+10*3=230
Checkcount[4]=70+60*2+30*3=280.

The final arrangement result and the interrupt checking numbers of the interrupt pins are shown in FIG. 6. Referring to FIG. 6, the total interrupt number of interrupts sent by the device paths is 500+130+100+70+60+50+40+30+10=990, and after being arranged with the method for dynamically arranging interrupt pins according to this embodiment, the interrupt checking number of only 500+210+230+280=1220 is required for the driver to check whether the interrupt is sent by its own corresponding hardware device. Accordingly, the optimization of the interrupt pin arrangement can be achieved.

In view of the above, the method for dynamically arranging interrupt pins according to the present invention at least has the following advantages.

1. The device paths are arranged to the interrupt pins on average according to the interrupt number that might be produced in each of the device paths, thereby effectively reducing the interrupt checking number required to check the driver that sends the interrupt when an interrupt is produced.

2. The device paths arranged to the same interrupt pin are sorted, and the drivers are connected in series accordingly, which thus reduces the interrupt checking number required to find the driver sending the interrupt in a single interrupt pin.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for dynamically arranging interrupt pins, suitable for arranging a plurality of interrupt pins of a control chip, comprising:

detecting a number of interrupts sent from a plurality of device paths in a unit time;

sorting the device paths into a sequence according to the interrupt numbers of each of the device paths; and arranging the device paths to the interrupt pins sequentially from the device path in the head of the sequence, such that an interrupt checking number required to check the device path sending an interrupt every time the interrupt is produced in each of the interrupt pins is the least.

2. The method for dynamically arranging interrupt pins as claimed in claim 1, wherein the step of arranging the device paths to the interrupt pins comprises:

calculating the interrupt checking number required to check the device path sending the interrupt every time the interrupt is produced in each of the interrupt pins according to the interrupt number of each of the device paths;

when arranging the next device path in the sequence, adding the device path to each of the interrupt pins, and respectively calculating the interrupt checking number required to check the device path sending the interrupt every time the interrupt is produced in each of the interrupt pins, after the device path is added; and arranging the device path to the interrupt pin with the least interrupt checking number.

3. The method for dynamically arranging interrupt pins as claimed in claim 2, wherein the step of calculating the interrupt checking number required to check the device path sending the interrupt every time the interrupt is produced in each of the interrupt pins comprises:

establishing a sequence directing to each of the device paths arranged to each of the interrupt pins, wherein the device path last added to the interrupt pins is sorted at the end; and multiplying the interrupt number of each of the device paths by a weight according to the sequence, and adding the calculation results, so as to obtain the interrupt checking number.

4. The method for dynamically arranging interrupt pins as claimed in claim 2, wherein the process for checking the interrupt checking number required to check the device path sending the interrupt is performed through a driver of a hardware device correspondingly allocated on each of the device paths.

5. The method for dynamically arranging interrupt pins as claimed in claim 4, wherein after the step of arranging the device paths to the interrupt pins, the method further comprises:

connecting the driver of the hardware device allocated on each of the device paths in series according to the sequence.

6. The method for dynamically arranging interrupt pins as claimed in claim 4, wherein the hardware devices comprise interface cards.

7. The method for dynamically arranging interrupt pins as claimed in claim 1, wherein the process for detecting the number of interrupts sent from a plurality of device paths in a unit time is performed through a driver of a hardware device correspondingly allocated on each of the device paths.

8. The method for dynamically arranging interrupt pins as claimed in claim 1, wherein after the step of detecting the number of interrupts sent from a plurality of device paths in a unit time, the method further comprises:

recording the device paths and the corresponding interrupt numbers in a memory.

9. The method for dynamically arranging interrupt pins as claimed in claim 8, wherein the memory comprises a non-volatile random access memory (NVRAM).

10. The method for dynamically arranging interrupt pins as claimed in claim 1, wherein the interrupt pins are connected to one of a programmable interrupt controller (PIC) and an I/O advanced programmable interrupt controller (IOAPIC).

11. The method for dynamically arranging interrupt pins as claimed in claim 1, wherein the process for sorting the device paths according to the interrupt numbers of each of the device paths comprises sorting in a sequence from large to small.

12. The method for dynamically arranging interrupt pins as claimed in claim 1, wherein the control chip comprises one of a Northbridge chip and a Southbridge chip.

* * * * *